(12) United States Patent
Jeong et al.

(10) Patent No.: US 7,417,971 B2
(45) Date of Patent: Aug. 26, 2008

(54) METHOD AND APPARATUS FOR DORMANT MODE SUPPORT WITH PAGING

(75) Inventors: Moo Ryong Jeong, San Jose, CA (US); Fujio Watanabe, Mountain View, CA (US); Toshiro Kawahara, Saratoga, CA (US)

(73) Assignee: NTT DoCoMo, Inc., Tokyo (JP)

( * ) Notice: Subject to any disclaimer, the term of this patent is extended or adjusted under 35 U.S.C. 154(b) by 82 days.

(21) Appl. No.: 11/153,032

(22) Filed: Jun. 14, 2005

(65) Prior Publication Data
US 2005/0232200 A1 Oct. 20, 2005

Related U.S. Application Data

(63) Continuation-in-part of application No. 10/264,807, filed on Oct. 4, 2002.

(51) Int. Cl.
*H04Q 7/00* (2006.01)
(52) U.S. Cl. .................. 370/331; 455/450; 455/436
(58) Field of Classification Search ............ 455/436, 455/450
See application file for complete search history.

(56) References Cited

U.S. PATENT DOCUMENTS

| | | | |
|---|---|---|---|
| 4,679,244 A | 7/1987 | Kawasaki et al. | |
| 5,077,834 A | 12/1991 | Andros et al. | |
| 5,109,530 A | 4/1992 | Stengel | |

(Continued)

FOREIGN PATENT DOCUMENTS

EP 1124399 A1 * 1/2001

(Continued)

OTHER PUBLICATIONS

Plamen Nedeltchev, Ph.D., Wireless LAN Ready for Prime Time, 13 No. 3 Packet™ Magazine, copyright © 2001 by Cisco System, Inc., 91 (2001).

(Continued)

*Primary Examiner*—Vincent P. Harper
*Assistant Examiner*—Charles Shedrick
(74) *Attorney, Agent, or Firm*—Blakely, Sokoloff, Taylor & Zafman LLP

(57) ABSTRACT

A method and communication system for supporting dormant mode are described. In one embodiment, the communication system comprises a wireless station operable in a power savings mode and group of access points. Each group of access points comprises one or more access points with at least one group of access points having at least two access points. Ranges for the one or more access points in each of the groups define a paging area for each group, wherein one access point uses a paging channel for paging the wireless station when the wireless station is in the power savings mode and is in the paging area associated with the one access point. The wireless station performs a handoff procedure when the one access point is not in the same group of access points as the access point associated with the wireless station prior to the wireless station entering the power savings mode and does not perform a handoff procedure when the one access point is in the same group of access points as the access point associated with the wireless station prior to the wireless station entering the power savings mode.

32 Claims, 13 Drawing Sheets

U.S. PATENT DOCUMENTS

| | | | |
|---|---|---|---|
| 5,237,603 | A | 8/1993 | Yamagata et al. |
| 5,241,568 | A | 8/1993 | Fernandez et al. |
| 5,613,204 | A | 3/1997 | Haberman et al. |
| 5,734,984 | A | 3/1998 | Reece et al. |
| 5,778,075 | A | 7/1998 | Haartsen |
| 5,835,860 | A * | 11/1998 | Diachina .................... 455/458 |
| 5,940,771 | A | 8/1999 | Gollnick et al. |
| 5,945,948 | A | 8/1999 | Buford et al. |
| 6,065,058 | A | 5/2000 | Hailpern et al. |
| 6,085,193 | A | 7/2000 | Malkin et al. |
| 6,088,591 | A | 7/2000 | Trompower et al. |
| 6,195,046 | B1 | 2/2001 | Gilhousen |
| 6,201,803 | B1 | 3/2001 | Munday et al. |
| 6,246,875 | B1 | 6/2001 | Seazholtz et al. |
| 6,259,898 | B1 | 7/2001 | Lewis |
| 6,345,043 | B1 | 2/2002 | Hsu |
| 6,351,468 | B1 | 2/2002 | LaRowe, Jr. et al. |
| 6,421,716 | B1 | 7/2002 | Eldridge et al. |
| 6,594,493 | B1 * | 7/2003 | Davies et al. ............... 455/436 |
| 6,650,630 | B1 | 11/2003 | Haartsen |
| 6,659,947 | B1 | 12/2003 | Carter et al. |
| 6,704,561 | B2 | 3/2004 | Kuroiwa |
| 6,788,668 | B1 | 9/2004 | Shah et al. |
| 6,870,822 | B2 | 3/2005 | Balogh |
| 6,914,906 | B1 | 7/2005 | Mullens et al. |
| 6,968,219 | B2 | 11/2005 | Pattabiraman et al. |
| 7,003,297 | B2 | 2/2006 | Willars et al. |
| 7,016,326 | B2 | 3/2006 | Holcman et al. |
| 7,039,027 | B2 | 5/2006 | Bridgelall |
| 2001/0032262 | A1 | 10/2001 | Sundqvist et al. |
| 2001/0049282 | A1 * | 12/2001 | Ushiki et al. ............... 455/422 |
| 2002/0023164 | A1 | 2/2002 | Lahr |
| 2002/0026592 | A1 | 2/2002 | Gavrilla et al. |
| 2002/0152288 | A1 | 10/2002 | Hora et al. |
| 2003/0018623 | A1 | 1/2003 | Aggarwal et al. |
| 2003/0134642 | A1 * | 7/2003 | Kostic et al. ................ 455/450 |
| 2003/0145092 | A1 | 7/2003 | Funato et al. |

FOREIGN PATENT DOCUMENTS

| | | |
|---|---|---|
| EP | 1124399 A1 | 8/2001 |
| WO | WO 99/48320 | 9/1999 |

OTHER PUBLICATIONS

R. Ramjee, L. Li, T. La Porta, and S. Kasera "IP Paging Service for Mobile Hosts," ACM Sigmobile Jul. 2001 Rome, Italy (2001).

B. Aboba, T. Moore "A Model for Context Transfer in IEEE 802," Internet Draft <draft-aboba-802-context-01.tx>, 1-16 (Apr. 6, 2002). Downloaded from: http://www.potaroo.net/ietf/ids/draft-aboba-802-context-02.txt (Oct. 4, 2002).

J. Kempf, "Dormant Mode Host Alerting ("IP Paging") Problem Statement", Internet Society 1-11 (2001). Downloaded from: http://www.faqs.org/rfc3132.html (Mar. 27, 2002).

Fabio M. Chiussi, et al. A Network Architecture for MPLS-Based Micro-Mobility, Bell Laboratories, Lucent Technology, N.J., USA. (2002) IEEE.

International Search Report, PCT/US03/02203, mailed May 13, 2003. 1 page.

Sarikaya, B., et al.: "Tracking agent based paging for wireless LANs" Consumer Communications and Networking Conference, 2004. CCNC 2004. First IEEE Las Vegas, NV, USA Jan. 5-8, 2004, Piscataway, NJ, USA, IEEE, Jan. 5, 2004, pp. 279-284, XP010696838.

PCT International Search Report for PCT Appln No. US2006/023049, mailed Oct. 24, 2006 (4 pages).

PCT Written Opinion for PCT Appln No. US2006/023049, mailed Oct. 24, 2006 (6 pages).

Mills, D. L., "Network Time Protocol (Version 3) Specification, Implementation and Analysis", RFC 1305, Mar. 1992.

Guttman, E., et al., "Service Location Protocol, Version 2", RFC 2608, Jun. 1999.

* cited by examiner

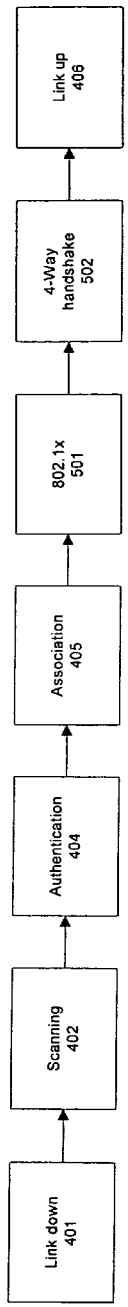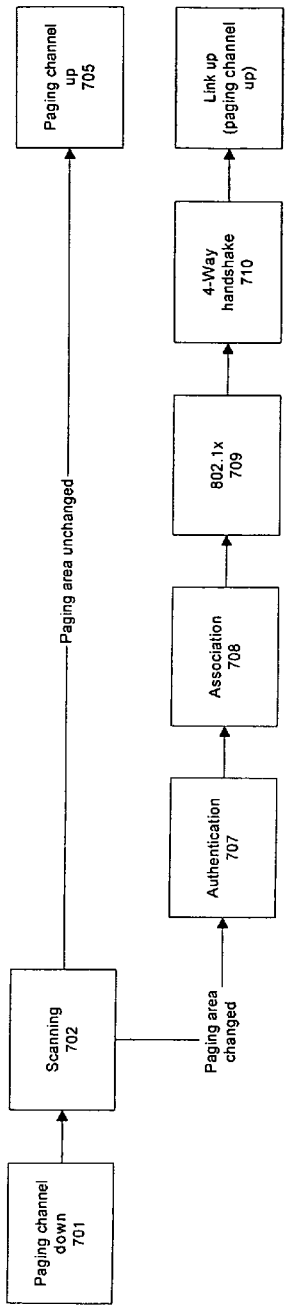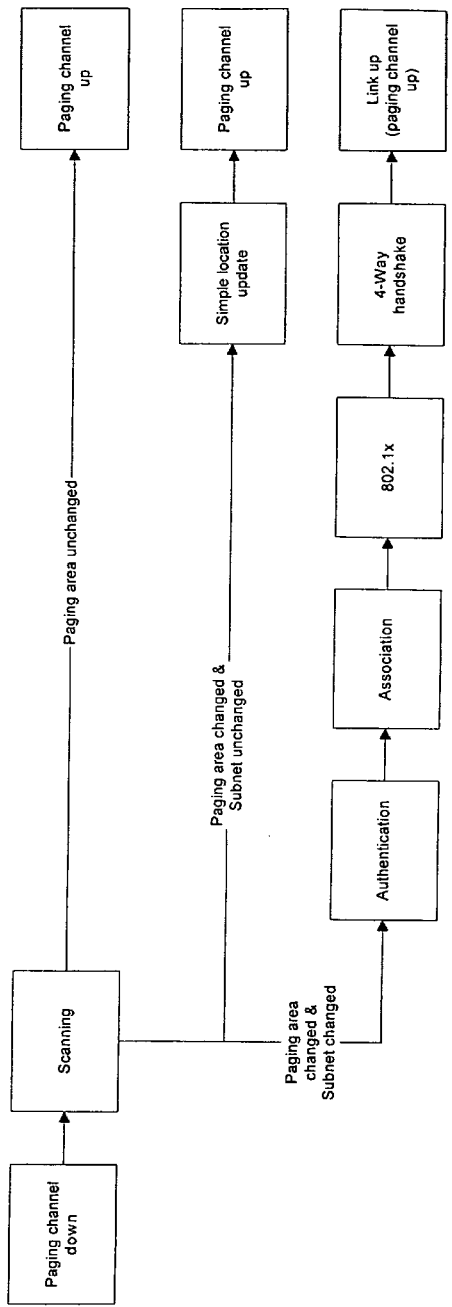

Location based update

METHOD AND APPARATUS FOR DORMANT MODE SUPPORT WITH PAGING

This application is a continuation-in-part of application Ser. No. 10/264,807, entitled "Method and Apparatus for Dormant Mode Support with Paging," filed Oct. 4, 2002, Publication No. US2003/0145092 A1, published Jul. 31, 2003.

FIELD OF THE INVENTION

The present invention relates to the field of wireless communication; more particularly, the present invention relates to paging of wireless stations in a wireless communications systems that allow wireless stations to enter an operational mode (e.g., a reduced power consumption mode) in which communication with the wireless station does not occur for periods of time and paging is used for locating wireless stations and for notifying wireless stations of messages that were sent while the wireless stations were in that operational mode.

BACKGROUND OF THE INVENTION

To increase battery life of wireless station, a power save mode is defined in many wireless network protocols. In IEEE 802.11 networks, a wireless station is either in a receive state in which it is listening for frames, a transmit state in which it is sending frames, or a power save mode in which it is neither transmitting nor receiving. This causes a very large portion of wireless stations to be powered-up most of time. The wireless station in power save mode consumes much less power by shutting off power to nearly everything except for a timing circuit. This enables the wireless station to consume very little power and wake up periodically (in multiples of beacon intervals) to receive beacon transmissions from an access point.

Paging is a wireless service for alerting a wireless station in a power save mode to the arrival of frames and optionally to buffer arrived frames until the paged station wakes up and receives them. The area in which paging is used is referred to as a paging area. A paging area boundary is defined by the outer perimeter of the ranges of a collection of access points (an "access point group") that are used to locate a dormant wireless station. This outer perimeter forms the paging area boundary of a paging area. Each paging area uniquely identifies itself to wireless stations by periodically broadcasting its unique paging area identifier. Although many cellular-based wireless WAN protocols support paging, WLAN protocols, such as the IEEE 802.11, do not specifically provide standards or methods for implementing paging. For example, the IEEE 802.11 protocol does not have paging areas with more than one access point, a dedicated paging channel and a radio link protocol specifically directed towards locating a dormant wireless station that is in a power save mode.

Some wireless networks, such as IEEE 802.11, have inflexible paging architecture. In IEEE 802.11, paging area consists of single access point, so wireless station should perform location registration whenever it enters coverage area of new AP. As wireless stations become more mobile, power consumption caused by inflexible paging architecture becomes more significant.

SUMMARY OF THE INVENTION

A method and communication system for supporting dormant mode are described. In one embodiment, the communication system comprises a wireless station operable in a power savings mode and group of access points. Each group of access points comprises one or more access points with at least one group of access points having at least two access points. Ranges for the one or more access points in each of the groups define a paging area for each group, wherein one access point uses a paging channel for paging the wireless station when the wireless station is in the power savings mode and is in the paging area associated with the one access point. The wireless station performs a handoff procedure when the one access point is not in the same group of access points as the access point associated with the wireless station prior to the wireless station entering the power savings mode and does not perform a handoff procedure when the one access point is in the same group of access points as the access point associated with the wireless station prior to the wireless station entering the power savings mode.

BRIEF DESCRIPTION OF THE DRAWINGS

The present invention will be understood more fully from the detailed description given below and from the accompanying drawings of various embodiments of the invention, which however, should not be taken to limit the invention to the specific embodiments, but are for explanation and understanding only.

FIG. 5 illustrates an alternative embodiment of a prior art location update procedure;

FIG. 7B-7C illustrate alternative embodiments of the local update procedure of the present invention;

DETAILED DESCRIPTION OF THE PRESENT INVENTION

Figure 1:
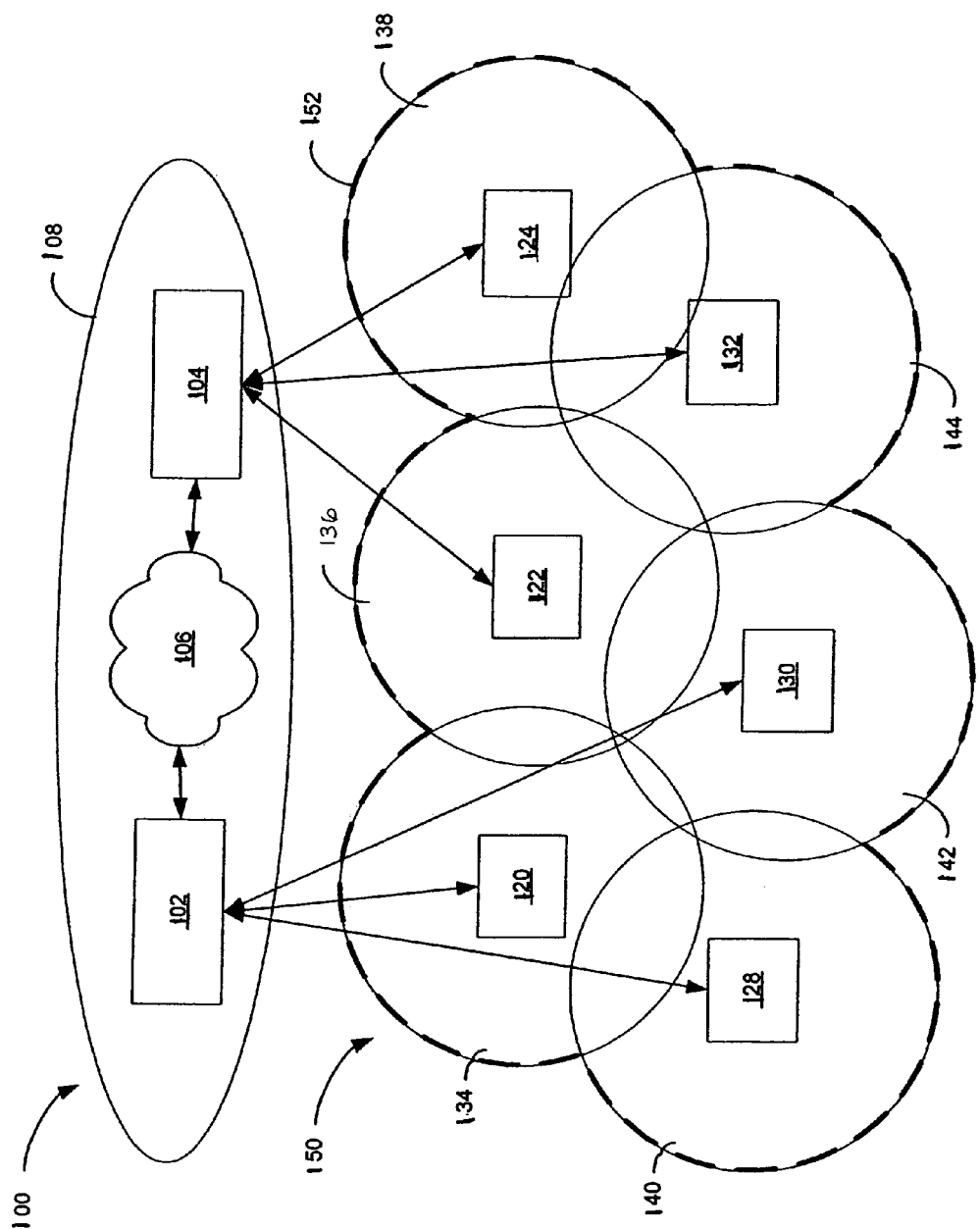
FIG. 1 is a diagram of one embodiment of a WLAN that supports paging.

A paging scheme for use in wireless networks is described. The paging scheme improves the power saving capability of wireless networks by enabling flexible paging area design. In one embodiment, the paging scheme enables the use of a power saving mode. A power save mode combined with paging increases the battery life of wireless stations by reducing the power consumption accompanied by the mobility of a wireless station.

In one embodiment, a paging area may consist of more than one access point, and the wireless station entering a coverage area of a new access point performs location registration if the new access point belongs to a new paging area, but it is not required to do so otherwise. As a result, a wireless station may move around the network coverage area without performing location registration, thereby reducing power consumption by avoiding an entire location registration procedure. Accordingly, a wireless station entering into new access points coverage area performs a complete handoff only when the new access point belongs to paging area different from the old access point. If the new access point belongs to the same paging area, the wireless station only synchronizes with the new access point. In contrast, with conventional wireless LANs, when a wireless station crosses the boundary of the coverage area of an access point and enters into the coverage area of another access point, it is required to perform a complete handoff between the two access points. Since wireless station must transmit/receive many frames to perform handoff and the handoff process often takes long time, power consumption of moving wireless station is much more than that of stable ones.

To this end, in one embodiment, each access point is assigned with a paging area ID that indicates the paging area it is in. (Design of a paging area is essentially assigning the ID of the paging area to the appropriate access points.) These access points having the same paging area ID exchange their paging information (e.g., TIM and access point identifier) with one another, and include the information within their beacon transmission with the ID of the corresponding access point. These beacons from the access points, in a collective sense, serve as the common paging channel for the access points within the paging area.

By properly selecting the size of paging area based on such factors as the mobility of wireless stations, traffic characteristics, and coverage area size, power consumption in total can be dramatically reduced.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic wireless station, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of Paging

Generally, a network implementing paging will be arranged to have at least two paging areas. In the prior art, when a wireless station crosses a paging area boundary from one paging area to another, the wireless station associates with the new access point in the next paging area. A wireless station detects when it crosses a paging area boundary by detecting a change in the unique paging area identifier that identifies in which paging area the wireless station is located. However, when neighboring paging areas overlap with each other, a wireless station may be in more than one paging area simultaneously and thus will detect more than one paging area identifier. In this case, the wireless station may opt not to associate with the access point in the next paging area as long as it detects the paging area identifier of the current paging area. Alternatively, the wireless station may detect the strength of the paging area identifier from each paging area that wireless station is within and associate with the paging area from which the strongest paging area identifier is broadcast.

The wireless station in power save mode is programmed to periodically go from power save mode to active mode so that it may detect the unique paging (or traffic indication) identifier or identifiers being broadcast. When this occurs, the wireless station provides its location to the network. In order to correctly deliver a paging service, a wireless network attempts to keep track of the location of each wireless station. One of the consequences of reducing the number of instances in which the wireless station informs the network of its location in the previously-described manner is that the network does not know the location of the wireless station within a given paging area. Because the wireless station may have moved after the last time it was synchronized and associated with an access point (the "old" access point), all that the network knows is that the wireless station is located somewhere within the paging area in which the access point serving the wireless station is located. In order for the network to forward IP traffic to the wireless station, it knows the access point for which the wireless station is currently in range (i.e., the "new access point") and alert the wireless station about the pending IP traffic. The network precisely locates the wireless station within a paging area by paging the wireless station.

Paging the wireless station starts with signaling by the network through the access points directed to the wireless station and alerting the wireless station to establish a connection. Paging the wireless station involves transmitting a request to all the access points in the same paging area as the old access point. These access points then broadcast the paging signal. When the wireless station receives the paging signal, it associates with the new access point. Once the wireless station associates with the new access point, the network knows the location of the wireless station in terms of the access point in which it is in range. The new access point then signals the old access point, and the old access point sends any buffered IP traffic to the new access point and the new access point delivers the buffered IP traffic to the wireless station.

With a paging service, an access point, noticing a wireless station is going to enter a power save mode, begins buffering frames for the wireless station for storage while it is in the power save mode. To alert the wireless station that frames are available for the wireless station, an access point transmits beacons containing a traffic indication map (TIM) that identifies the wireless station in power saving mode whose frames are buffered at the access point and are awaiting delivery.

When a wireless station in a power save mode exists the power saving mode and determines from the beacon that there are frames waiting, the wireless station communicates with the access point to retrieve them. After that, the wireless station can return to the power saving mode until its scheduled time to listen for the next beacon transmission. Such mode transitions between the power saving mode and receiving mode are autonomously done by the wireless station so the transitions do not require any explicit message exchanges with access point.

Paging areas are needed to enable the paging functionality and do so primarily by using paging groups to define paging area boundaries. The paging groups are generally formed from a subset of all the access points within the WLAN or network. The structure of paging areas and established access points groups, including a protocol to manipulate access point groups, is described in U.S. provisional patent application entitled "METHOD AND APPARATUS FOR DORMANT MODE SUPPORT WITH PAGING," Ser. No. 10/264,807, filed Oct. 4, 2002, Publication No. 2003/0145092 A1, published Jul. 31, 2003.

Once access point groups have been formed, they communicate their identity to any wireless station that is within the paging area that they define so that the wireless stations can be located. The step of communicating access point group information to wireless stations generally includes (a) including the access point group's paging area ID in the beacon of each access point in the access point group; (b) assigning a channel over which to broadcast the beacon; and (c) awakening the wireless station to periodically detect the beacon. Beacons are signals that are periodically broadcast from each of the access points and contain a variety of information.

In one embodiment, each access point is assigned with its paging area ID and broadcasts the paging area ID in beacon transmission. An access point group's unique paging area ID enables one paging group (or paging area) to be distinguished from another. Each paging group is assigned a unique paging area ID and communicates this paging area ID to any wireless stations within that paging group's paging area so that a wireless station can determine in which paging area it is located. This may be accomplished using a beacon packet or beacon, such as the beacon in the IEEE 802.11 protocol.

In conventional IEEE 802.11, BSSID, which is ID of an access point, serves as paging area ID, so there should be single access point in a paging area. In contrast, in one embodiment, ESSID, which is ID of an ESS (a set of access points), may be used as paging area ID. Since the access points in the paging area are given the same ID, the paging area is easy to enlarge by adding another access point and announcing the paging area ID and having that access point announce its paging area in the beacons.

Paging is performed over a channel. The channel may be a physical channel or a virtual channel. Such channels may be assigned in many ways. Methods of channel assignment include: (1) static assignment; (2) standard common paging channel assignment; and (3) local common paging channel assignment method. In the static assignment method, all the access points in the WLAN are assigned the same common channel over which to broadcast the IP traffic and the beacon. In the standard common paging channel assignment method, the access points are assigned a universal common channel over which to broadcast the beacon and a different common channel over which to broadcast the IP traffic. In the local common paging channel assignment method, all the access points in the same access point group are assigned the same channel for paging with no adjacent access paging groups assigned the same paging channel and a channel for IP traffic that is different from any of the paging channels.

In the local common paging channel assignment method, the access points in the same access point group are assigned the same paging channel. However, no adjacent access paging groups are assigned the same paging channel. The IP channel is a channel, which is different from any of the paging channels. In one embodiment, the paging channel for each access point group is assigned by that access point group's root access point. Additionally, each slave access point uses the same paging channel as its master and none of the slave access points uses the paging channel as its IP channel. In this approach, the wireless station need only search for the paging channel when it crosses a paging area boundary because all the access points in the access point group have the same paging area ID. Additionally, assigning different beacon channels to adjacent access point groups helps to reduce the risk of interference among the beacon channels of these groups.

In order for a wireless station to detect a beacon or other packet, it must be awakened from the power save mode. Once awakened into active mode, the wireless station searches for the paging channel for the beacon or other packet. Generally, the wireless station itself is programmed to periodically awaken at set intervals and remain in active mode for a predetermined time period (the "beacon window"). In one embodiment, this temporary transition of wireless station between power save mode and active mode at the start and the end of beacon window is not accompanied by explicit power mode transition messages to further save power. However, the set intervals and beacon window need to generally correspond with the timing of the beacon broadcast (the "beacon timing") of the access points.

In one embodiment, the timing of the beacon broadcasts for each access point within an access point group need not be synchronized to occur approximately at the same time (the "beacon timing"). Because the beacon broadcasts in an access point group do not have to occur at the same time, no synchronization of beacon timing is necessary.

Locating a wireless station in a paging area includes associating the wireless station with an access point or access point group whenever it crosses a paging area boundary, and whenever it is paged. Whenever a wireless station crosses a paging area boundary, it associates with a new access point in a new access point group. Whenever a wireless station is paged, it associates with the access point for which it is in range so that it can receive IP traffic. To associate with an access point, the wireless station sends a request to associate to the new access point. Thereafter, an association identification ("AID") is assigned to the wireless station.

Generally, paging areas are defined by the outermost perimeter of the ranges of the outermost access point groups within a paging group. This outer most perimeter is the paging area boundary. The paging groups are generally formed from a subset of all the access points within the WLAN or network by defining the structure of the access point group which establishes the relationships among the access points. One example is shown in FIG. 1 wherein a WLAN 100 for which a paging area has been defined is shown. In this WLAN 100, there are two nodes 102 and 104 connected to a network 106, such as the Internet, by some type of wired or wireless connection. A plurality of access points 120, 122, 124, 128, 130 and 132 are connected to nodes 102 and 104 via some type of wired connection. The access points 120, 122, 124, 128, 130 and 132 are grouped together so that the ranges of the access points 134, 136, 138, 140, 142 and 144 define a paging area 150 having a paging area boundary 152.

Figure 2:
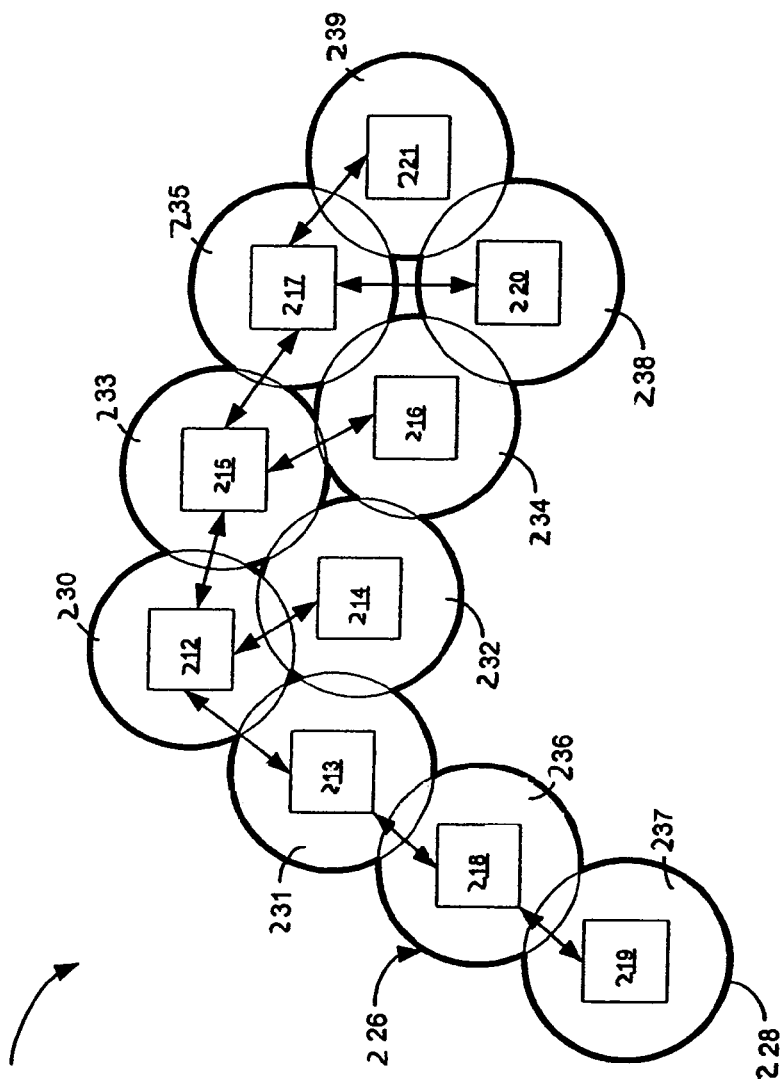
FIG. 2 is a diagram of one embodiment of an access point group that uses a structured distributed grouping.

In another example, the relationships among the access points in a paging group may be defined by a tree structured distributed group model. FIG. 2 shows an access point group 210 wherein the relationships among the access points 212-221 in the access point group 210 are defined by a distributed group model. The paging group 210 is comprised of access points 212-221 and defines a paging area 226. The paging area boundary 228 is defined by the outermost perimeters of the ranges 230-239 of the access points 212-221, and encloses the paging area 226.

A tree structured distributed group model has a hierarchical tree structure. In the hierarchical tree structure, each access point is connected to one or more access points directly below it. Additionally, access points are defined in terms of functionality as "master," "slave," or both. A master is an access point to which other access points belong and which has the ability to control the access points that belong to it. In FIG. 2, the master access points are 212, 213, 215, 217 and 218. A slave is an access point that belongs to a master. In the access point group 210, the slave access points are 213-221. It is possible to be a master and a slave with the functionality of both at the same time, such as access points 213, 215, 217 and 218. Additionally, an access point may be the master of more than one access point as are access points 212, 215 and 217.

However, an access point may not have more than one master. If an access point is simultaneously both a master and a slave, in one embodiment, the master follows the slave's attributes. Each access point group has one access point to which all others belong, directly or indirectly. This is called the "root access point" (access point 212). Access points at which the tree structure terminates are called "leaf access points" (access points 214, 216, 219, 220 and 221). All remaining access points are called "intermediate access points" (access points 213, 215, 217 and 218).

Figure 3:
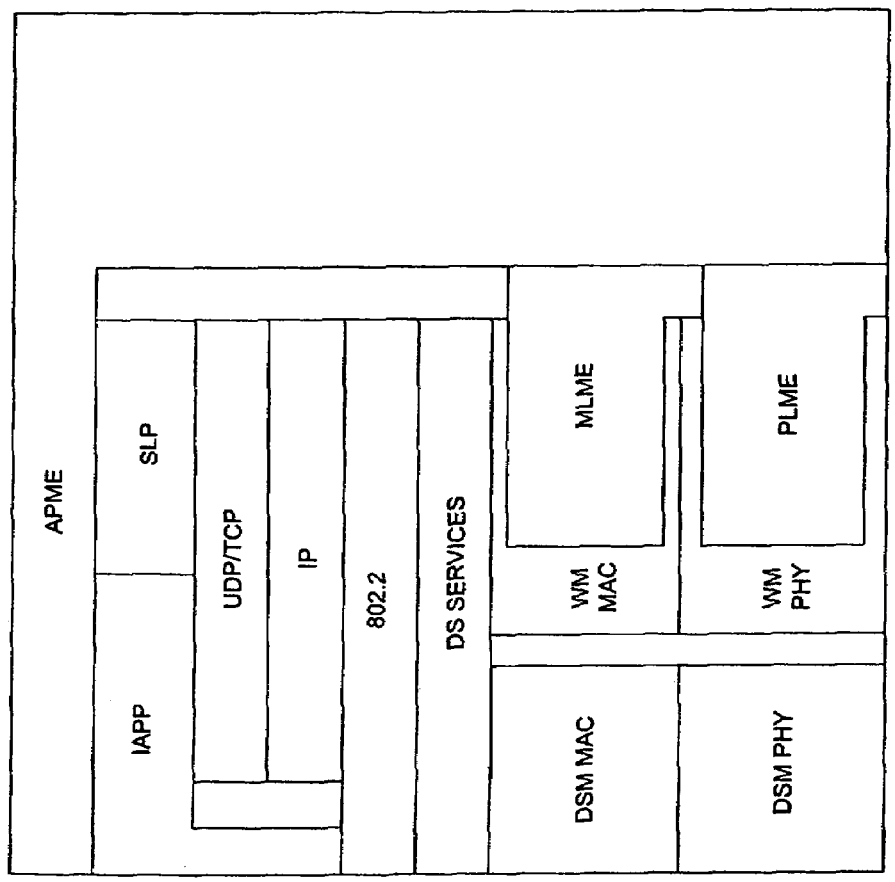
FIG. 3 is a diagram of a prior art IAPP architecture.

Establishing a protocol for communications among the access points in an access point group may include developing a unique protocol or modifying an existing one. The IEEE Inter Access Point Protocol ("IAPP") is an existing protocol between access points that allows conformant access points from multiple vendors to interoperate on a common distribution system. IAPP specifies the functionality of the access points (which describes service primitives), a set of functions and a protocol that will allow IP packets to be carried between access points. FIG. 3 shows the IAPP architecture. The access point management entity or APME 40 is used as the main operational program of the access point, implementing the access point manufacturer's proprietary features and algorithms. A tree structured distributed model for the access point group is implemented in the APME.

Access point groups communicate their identity to any wireless station that is within the paging area that they define so that the wireless stations can be located. Although the following examples will discuss these methods with regard to a single wireless station for clarity, the methods may also be applied when a plurality of wireless stations are present.

An access point group's unique paging area ID is included in the beacon of each access point to enable one paging group (or paging area) to be distinguished from another. In one embodiment, to enable a wireless station can determine the paging area in which it is located, each paging group is assigned a unique paging area ID and communicates this paging area ID to any wireless stations within its respective paging area. This may be accomplished using the beacon packet (hereinafter "beacon") in the IEEE 802.11 protocol.

Beacons provide a mechanism for access points in an access group to communicate with each other. The beacon is a signal that is periodically broadcast by each of the access points and can contain a variety of information. Each packet of information in the beacon is called an "element." In one embodiment, the beacon is the beacon included in the IEEE 802.11 protocol. An exemplary format of the beacon is shown in application Ser. No. 10/264,807, entitled "Method and Apparatus for Dormant Mode Support with Paging," filed Oct. 4, 2002, Publication No. US2003/0145092 A1, published Jul. 31, 2003.

While in a power savings mode, the wireless station may remain stationary, move within the range of the first access point, move into the range of another access point within the first paging area (the "second access point") or move into a second paging area. If the wireless station remains stationary, moves within the range of the first access point or moves into the range of a second access point, it will awaken at its set interval (now set to the group beacon timing) and listen for a new beacon. The new beacon will either be the first access point's beacon, or it will be the second access point's beacon if the wireless station has moved into the range of the second access point. The wireless station then determines whether it senses a new beacon during the beacon window. If it determines that it has sensed a beacon during the beacon window, the timing of the new beacon and the beacon window is set. Therefore, the wireless station returns to the power savings mode and the steps are repeated until the wireless station determines that it does not sense a new beacon during its beacon window.

If the wireless station determines that it has not sensed a new beacon during its beacon window, the wireless station exits the power saving mode and returns to an active mode at the time of a beacon for another access point in the paging area to sense a new beacon.

If the new beacon is from the second access point, this means that the wireless station has moved into the range of the second access point. If the first and second access points are in different paging areas, as indicated by the paging area ID included in the beacon, the wireless station synchronizes to the second access point.

The step of locating a wireless station includes associating the wireless station whenever it crosses a paging area boundary and whenever it is paged. Whenever a wireless station crosses a paging area boundary, it associates with a new access point group. In order to associate with a new access point group, the wireless station will communicate with an access point in the access point group of which the wireless station is in range (the "in-range access point"). More specifically, to associate with a new access point group, the wireless station sends a request to associate to the in-range access point. The root access point of the new access point group, which may be the in-range access point, then assigns an association identification ("AID") to the wireless station and adds the AID and the associated MAC address of the wireless station to its association table. The AID will typically have a value of in the range of about 1 to about 2007 and is placed in the 14 least significant bits of the AID field with the two least significant bits of the AID filed each set to "1." The root access point of the new access point group will then communicate the MAC address and AID of the wireless station to the other access points in the new access point group. This communication occurs during association and thru the use of IAPP to broadcast the IAPP-ADD request (which includes the MAC address and AID of the wireless station) over the local subnet broadcast using IAPP to all the access points on the same subnet. This communicates the MAC address of the wireless station to the access points on the same subnet as the root access point. For access points in the access point group that are not on the same subnet as the root access point, IAPP may also be used to communicate the MAC address of the wireless station. Because the MAC address is used to identify the wireless station instead of the IP address, the problems normally associated with a wireless station moving from one subnet to the other are avoided.

The AID will remain associated with the wireless station and the MAC number of the wireless station will remain in the association tables of the access points of the new access point group until the wireless station explicitly or implicitly disassociates from the new access point group. To disassociate explicitly, the wireless station invokes a disassociation service. To disassociate implicitly the wireless station simply leaves the range of the new access point group without explicitly disassociating. The new access point group may discover that the wireless station has left its range without explicitly disassociating when the new access point group does not receive a communication from the wireless station within a predetermined time period. At this time, the wireless station will be disassociated. When the wireless station disassociates from the access point group, the AID is available to be reused and the wireless station's MAC address is deleted from the association tables of the access points in the new access point group.

In addition to associating with an access point group, the wireless station must also associate with an access point when it is paged so that it can receive IP traffic. Once a wireless station has associated with an access point group, that access point group may then receive IP traffic for that wireless station through the root access point. In one embodiment, when the root access point receives IP traffic for the wireless station, the wireless station must then be located within the access point group and, if in dormant mode, the wireless station is moved into active mode. Because the location of the wireless station within the access point group is unknown, the root access point communicates to the other access points in the access point group that the wireless station needs to be paged. All the access points in the access point group then page the wireless station. After receiving the page, the wireless station then sends a request to associate to whichever of the access points the wireless station is in range. That access point then notifies the root access point of the presence of the wireless station within its range and the root access point then forwards the IP traffic to that access point. That access point then forwards the IP traffic to the wireless station. While the wireless station is in active mode, if it moves into the range of a second access point in the same access point group, it will register with the second access point.

The Handoff Procedure

In one embodiment, when the access point currently serving a wireless station (i.e., the serving access point) is not available, the beacon may not be heard by the wireless station. In such a case, the wireless station scans to locate another access point. If the access point is in the same paging area, no handoff is needed. This results in power savings. That is, one embodiment of the present invention allows power savings to be achieved because a portion of the location update procedure do not need to be performed when the wireless station exits the power saving mode and the access point serving the wireless station has changed but not its paging area.

Figure 4:
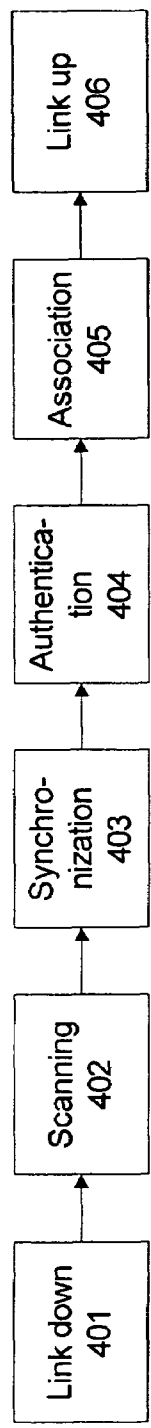
FIG. 4 illustrates one embodiment of a prior art location update procedure.

More specifically, in wireless networks, such as IEEE 802.11, having a single access point in a paging area, a wireless station performs location registration by making a handoff to a new access point. FIG. 4 shows the current location update and handoff procedure of IEEE 802.11 (i.e., L2 handoff procedure), comprising the steps of scanning 402, synchronization 403, authentication 404, and association (or reassociation 405. The wireless station should be fully powered up during these steps since it cannot enter power save mode until association 405 is completed. In scanning step 402, the wireless station scans one or more radio channels available for the wireless network to determine which network to join. There are two ways of scanning: passive and active. Passive scanning listens for beacon frames from access points. Active scanning involves a transmission of probe request frames for soliciting a probe response from the access points. When it receives beacon frames or probe response frames from an access point, the wireless station gathers information about the reachability and the characteristics (such as capability, supported rates, and timing information) of the access point. In synchronization step 403, the wireless station determines the network to which to handoff and then synchronizes to the network by adopting the timing information of the access point. In authentication step 404, the wireless station establishes its identity as a member of the set of stations authorized to associate with the access point. There are two ways of authentication: open and shared-key. Open system authentication is the simplest of the available authentication algorithms. Essentially, open system authentication a null authentication that authenticates any wireless station that requests open system authentication. Shared key authentication supports authentication of stations as either a member of those who know a shared secret key or a member of those who do not. In association step 405, the access point/wireless station mapping is established, thereby enabling the station to be invoked from the distribution system.

Furthermore, as shown in FIG. 5, there will be two more steps in handoff process to complete according to the upcoming standard with improved security (Tgi), further increasing the power consumption. These steps are 802.1X step 501 and 4-way handshake step 502. In these steps, mutual authentication between the access point and the wireless station is done and security association between them is established by using pre-established security associations between the access point and an access server and between the wireless station and the access server.

Figure 6A:
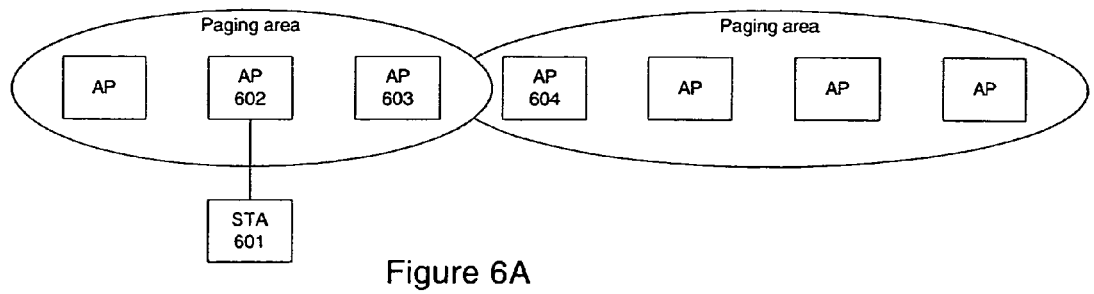
FIGS. 6A-6C illustrate an arrangement of two paging areas where each paging area has multiple access points.
Figure 6B:
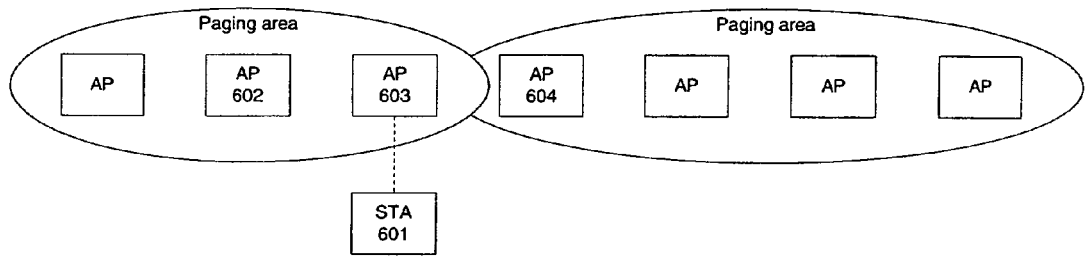
Figure 6C:
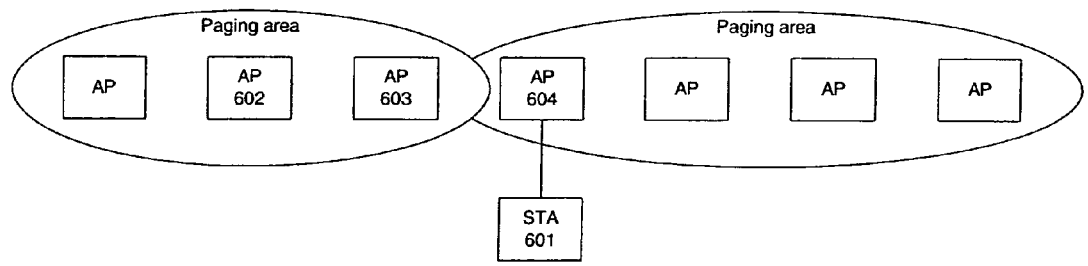

FIGS. 6A-6C illustrate an arrangement of two paging areas where each paging area has multiple access points. As a wireless station is associated with one of the access points in the paging area, such as wireless station 601 which is associated with access point 602. When the wireless station 601 moves away from access point 602, it may become associated with access point 603. In such a case, because access point 602 and 603 are in the same paging area, no handoff needs to occur. However, as illustrated in FIG. 6C, when the wireless station moves out of the coverage area of access point 603 and into the coverage area of 604, wireless station 601 has entered a new paging area and a handoff must occur.

Figure 7A:
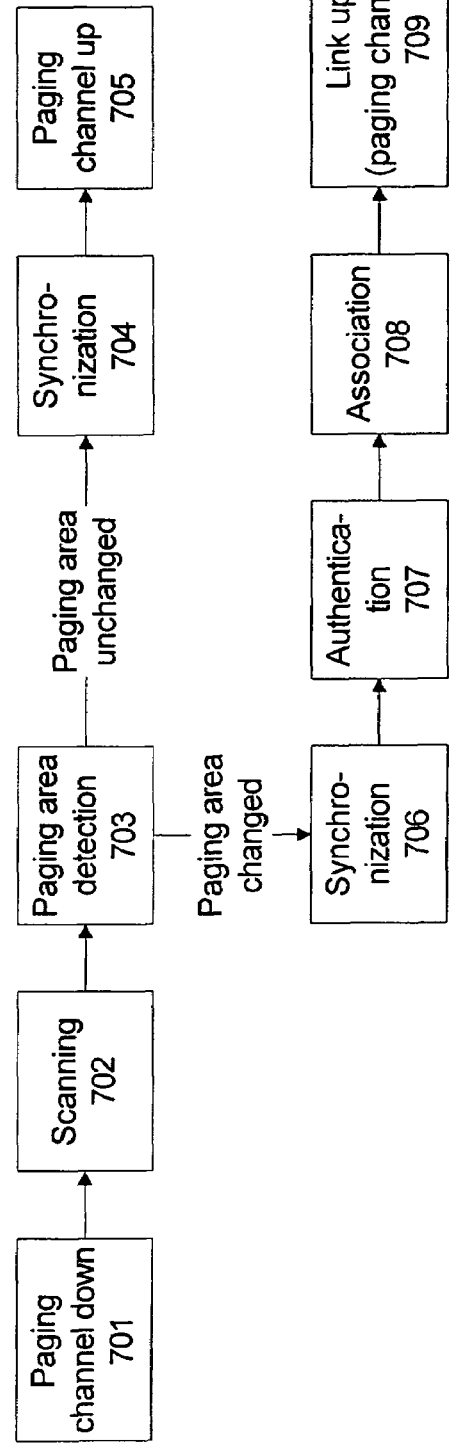
FIG. 7A illustrates one embodiment of the location updating procedure of the present invention.

FIG. 7A illustrates one embodiment of the location updating procedure of the present invention. Referring to FIG. 7A, when the paging channel is down, a wireless station performs scanning (processing block 702). This may occur when the wireless station is in power save mode and has been moving around. The result of the scanning process is to find a new time for the TIM or beacon.

As a result of scanning, processing logic and the wireless station performs paging area detection (processing block 703) to detect the paging area. If the paging area is unchanged, processing logic synchronizes with the access point (processing block 704), resulting in the paging channel being up (705). If the paging area has been changed, processing logic and the wireless station performs synchronization (processing block 706), authentication (processing block 707) and association (processing block 708) and the link and the paging channel are up (709). That is, because the paging area has changed, the entire handoff procedure is performed. If the paging areas haven't changed, because the wireless station does not have to perform authentication and association, there is a power savings that is incurred.

FIG. 7B illustrates an alternative embodiment of the local update procedure of the present invention. Referring to FIG. 7B, while the paging channel is down, the wireless station performs scanning to find an access point. After scanning, if the wireless station determines as the result of paging area detection, that the paging area has not changed, the wireless station performs synchronization so that the paging channel comes up. However, if, as a result of paging area detection, the wireless station determines that the paging area has changed, then the wireless station goes through authentication (processing block 707), association (processing block 708), 802.1X (processing block 709) and four-way handshake (processing block 710), and thereafter the link and paging channel are up. As shown in FIG. 7B, when the paging is unchanged, authentication, association, 802.1X and four-way handshaking do not have to occur, resulting in a large power savings.

In an alternative embodiment, in the location update (and handoff) procedure of the present invention, if the result of the scanning process indicates that the paging area has changed, yet the subnet hasn't changed, the wireless station employs a simple location update procedure that includes merely authentication and association, but not 802.1X and four-way handshaking, in order for the paging channel to come up. The paging area ID may be grouped so that paging areas in the same subnet have the same prefix, suffix, or the like, in the paging area ID, enabling wireless stations to detect the subnet changes by comparing the two paging area IDs. Alternatively, a subnet related information field may be included in the beacon such that a wireless station may detect subnet change by comparing the fields of the beacons from the two APs. However, if the paging area has changed and the subnet has changed, the full location update (handoff) procedure is performed. This alternative embodiment is shown in FIG. 7C. Thus, in the case where the paging area is unchanged or in the case where the paging is changed, but the subnet has not changed, power savings can be achieved.

To facilitate this paging scheme, in one embodiment, the access point has its own timing of the TIM or beacon. That is, the TIMs for all the access points in the same paging area need not be the same or need not be synchronized and the TIM can be located through the scanning process. In one embodiment, the BSSID and TIM pairs of each access point in the same paging area are sent in each beacon. That is, to provide paging channel for all access points, the TIMs for every access point in the paging area having wireless stations to page are included in the beacon that is sent by an access point. This allows the wireless station to listen to and select a beacon from any access point. To reduce the use of power that would occur during scanning, the target beacon transmission time (TBTT) may be utilized. In such a case, the position of the beacon transmission time could be determined from TBTT-offset and beacon interval ratio. TBTT offset of APj from APi (TOij) and beacon interval ratio of APj over APi (Rij) have the values so that the following equation holds:

$$TBTT(APj)=TBTT(APi)+k*Rij*BI(APi)+TO(ij)$$

where, TBTT(APj), TBTT(APi), and BI(APi) are TBTT of APj, TBTT of APi at, and beacon interval of APi, respectively. k is any integer.

The wireless station can calculate the beam transmission time of a new access point using the above equation if the required information such as the offset and the ratio are available. In one embodiment, all the required information is included in the beacon of the old access point. By receiving at least one beacon before a paging channel goes down, wireless stations obtains all the information required for scanning. Alternatively, information on old access point and new access point may be obtained from different access points (one from the old access point, the other from another access point or access points to which the wireless station was listening before it began listening to the old access point).

Access points use paging to alert wireless stations in the power saving mode to the message arrival and buffers arrive messages until the paged wireless stations wake up and receives them.

Figure 8:
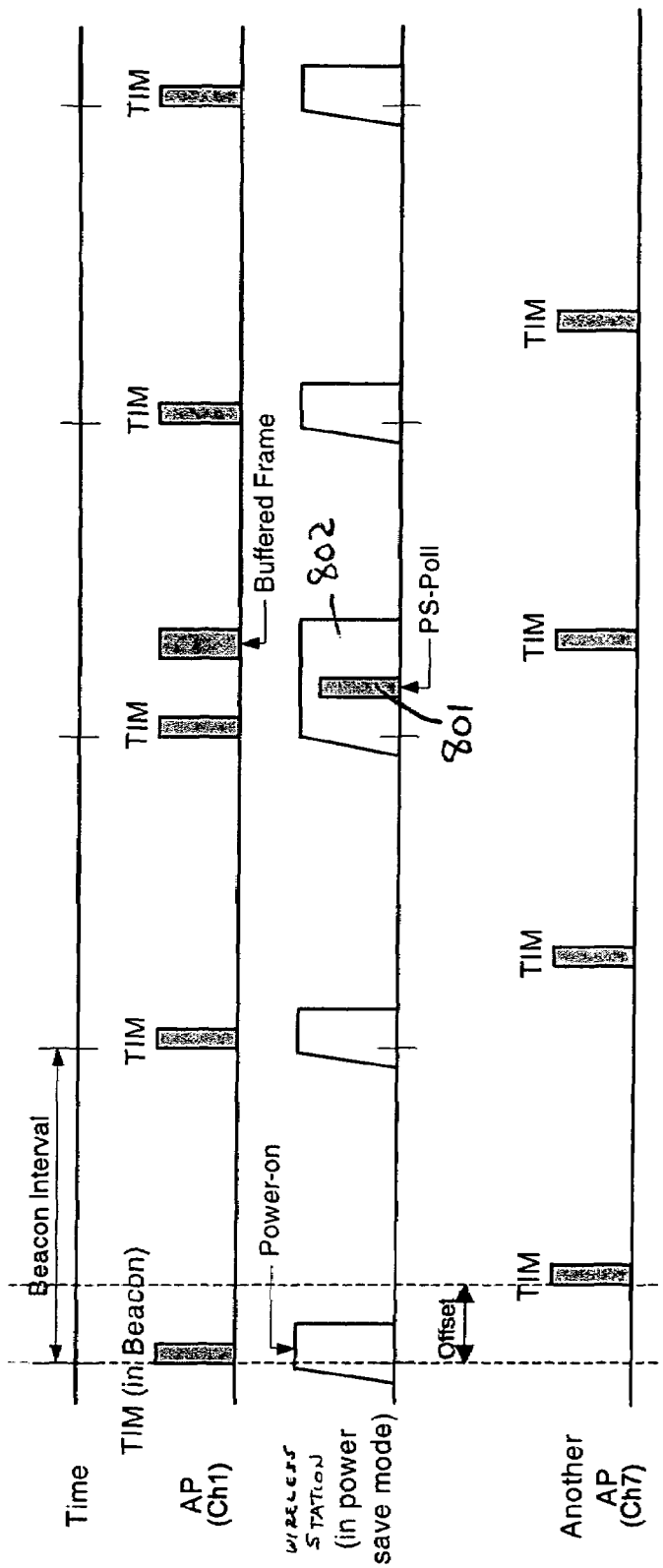
FIG. 8 illustrates the access point for the TIM that occurs in the beacon at a beacon interval.

FIG. 8 illustrates the TIM for an access point that occurs in the beacon at a beacon interval. Because the wireless station knows the transmission time of the beacon and its beacon interval, the wireless station knows when to temporarily power on (temporarily exit the power saving mode without an explicit message exchange with the access point for a power mode change) to check to see if it's been paged. During each power on session, the wireless station checks whether it has been paged while in a power saving mode. In one embodiment, this is indicated by a bit being set in the beacon signal. In another embodiment, this is indicated by the use of a predetermined value in a designated field. If the wireless station is paged, the wireless station remains powered on to receive messages that might have been sent to it while in the power savings mode. If the wireless station is associated with the access point, it may receive a message by performing a polling operation as shown in 801 or by completely exiting power saving mode by using an explicit message exchange with the access point. If the wireless station is not associated with the access point, it performs a handoff to the access point before receiving messages. In a polling operation as shown in 801, the power on time 802 is expanded to receive the frame that has been buffered. Note also that FIG. 8 shows the TIM of another access point in the same paging area occurred at a different transmission time than the access point currently serving the wireless station.

Figure 9:
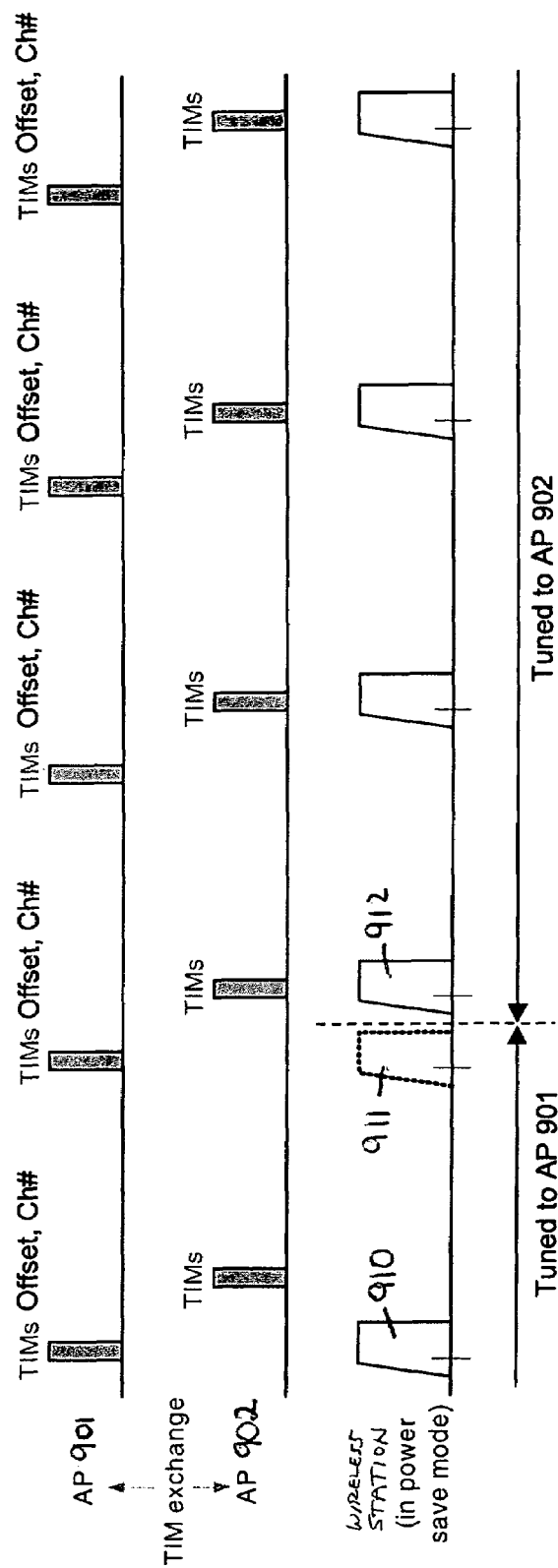
FIG. 9 illustrates the TIMs for multiple access points.

FIG. 9 illustrates beacons (each including a TIM as an example) for multiple access points. Access points may exchange their beacon broadcast times so that the beacon from an access point includes the time information of beacon transmission by other access points in the same paging area. The time information of the beacon transmission may include a TBTT offset of a neighbor access point from the access point that is sending the beacon. It may also include a beacon interval ratio of a neighbor access point over the access point that is sending the beacon. A beacon may include time information for all access points in the paging area, for the access points neighboring the access points that is sending the beacon, or for the access points selected by any other means.

Referring to FIG. 9, access point 901 and access point 902 have TIMs with different transmission times. A wireless station is associated with access point 901 when the wireless station is powered on at time 910. During this interval, the wireless station expects to receive a beacon signal of access point 901 because access point 901 is currently serving the wireless station. However, at time 911, the wireless station powers up again expecting to see the beacon of access point 901, and there is no beacon signal to receive. This may be, of course, due to movement by the wireless station causing it to be unable to receive the beacon transmission of access point 901 or access point 901 may no longer be available. However, because wireless station has the time information of beacon transmission by the other access points in the same paging area, the wireless station knows to power up at time 912 and seize the beacon of access point 902. Thus, by having the access points exchange their beacon transmission time information and transmit such information for the access points in the same paging area in each or selected beacon, wireless stations are able to predict the beacon transmission time of the access points in the paging area and are able to power up (temporarily exit the power saving mode without exchanging power mode change message with the access point) at the proper time. This results in large power savings since the wireless station does not have to continuously scan for the beacons of other access points after powering up and not receiving the beacon of its currently serving access point.

Figure 10A:
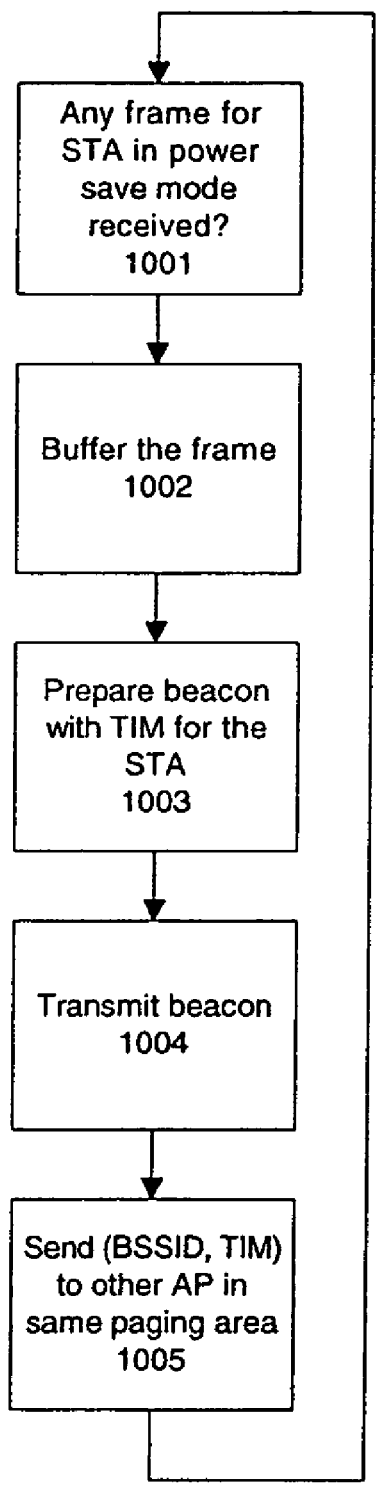
FIG. 10A is a flow diagram of one embodiment of a process used by access point to provide paging.

FIG. 10A is a flow diagram of one embodiment of a process used by access point to provide paging. The process is performed by processing logic which may comprise hardware (e.g., circuitry, dedicated logic, etc.), software (such as is run on a general purpose computer system or a dedicated machine), or a combination of both.

Referring to FIG. 10A, the process begins by processing logic determining whether any frame for a wireless station in the reduced power mode has been received (processing block 1001). Processing logic in the access point buffers the frame (processing block 1002) and prepares a beacon with the TIM (processing block 1003). The access point then transmits the beacon (processing block 1004) and sends the BSSID and TIM to other access points in the same paging area (processing block 1005). Thereafter, the process transitions back to processing block 1001 where the process is repeated.

In another embodiment, a TIM for more than one wireless station is prepared at processing block 1003 and the access point may transmit beacon with the TIM at processing block 1004 when frames for more than one wireless stations in power save mode are received. Similarly, at processing block 1005 the access point may send the BSSID and TIM for more than one wireless stations. These embodiments may reduce the amount of data exchanged over the air (for the beacon) and over the backbone (for BSSID and TIM).

In yet another embodiment, processing block 1005 is performed only when paging by transmitting the beacon at processing block 1004 fails. When the paging by the current access point is successful, this embodiment may reduce the amount of data exchanged over the backbone with neighboring access points and over the air (transmission of TIMs by neighboring access points).

Figure 10B:
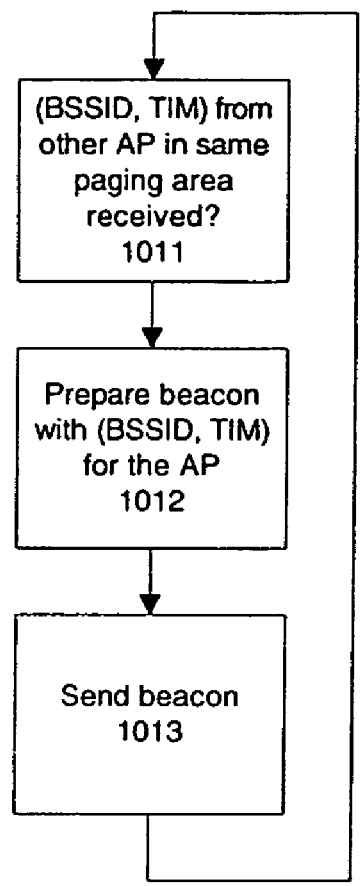
FIG. 10B is a flow diagram of a process performed by neighboring access points when paging by the current service access point fails.

FIG. 10B is a flow diagram of a process performed by neighboring access points. Processing is performed by processing logic which may comprise hardware (e.g., circuitry, dedicated logic, etc.), software (such as is run on a general purpose computer system or a dedicated machine), or a combination of both.

Referring to FIG. 10B, the process begins with processing logic testing whether the BSSID and TIM is received from another access point from an access point in the same paging area (processing block 1011). If it is, processing logic prepares a beacon with the BSSID and TIM for the access point (processing block 1012) and sends the beacon (processing block 1013). Thereafter, processing transitions to processing block 1011 where the process is repeated.

In another embodiment, beacon having the BSSIDs and TIMs from more than one access point is prepared at processing block 1012 and the access point may transmit such a beacon when receiving the BSSIDs and TIMS from more than one access points.

Figure 11:
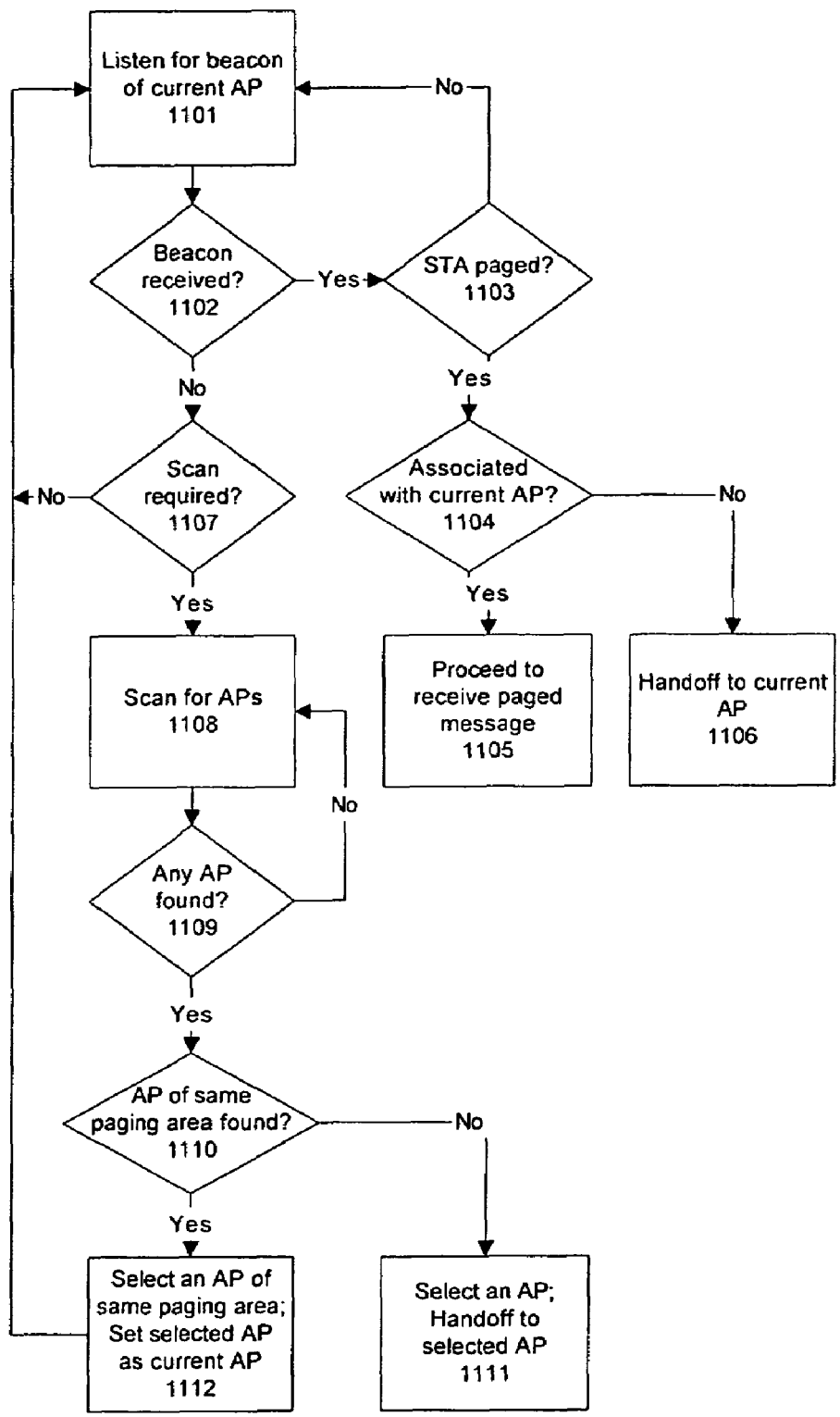
FIG. 11 is a flow diagram of one embodiment of a process performed by a wireless station for handling paging.

FIG. 11 is a flow diagram of one embodiment of a process performed by a wireless station for handling paging. The process is performed by processing logic which may comprise hardware (e.g., circuitry, dedicated logic, etc.), software (such as is run on a general purpose computer system or a dedicated machine), or a combination of both.

Referring to FIG. 11, the process begins by processing logic listening for the beacon from the current access point (processing block 1101). Processing logic then tests whether a beacon has been received (processing block 1102).

If a beacon has been received, processing logic checks whether the wireless station has been paged (processing block 1103). In one embodiment, this is done by checking whether a designated bit in the beacon is set. In another embodiment, this is done by checking whether a designated field in the beacon has the predetermined value. If the wireless station is not paged, processing logic returns to the power save mode and the process transitions to processing block 1101 where the wireless station will periodically exit the power savings mode and check for beacons. If the wireless station has been paged, processing logic tests whether it is associated with the current access point (processing block 1104). If it is, processing logic proceeds to receive the paged message (processing block 1105). If it is not, processing logic initiates a handoff process to the current access point so that it may associate with the current access point and receive the paged message (processing block 1106).

If a beacon is not received (at processing block 1102), processing logic determines whether a scan is required (processing block 1107). In one embodiment, a scan may not be required upon the first occurrence, or some predetermined number of occurrences, of the wireless station exiting the power save mode and not locating a beacon during its scheduled time. If scanning is not required, processing transitions to processing block 1101 where the process repeats at a point in the future.

If a scan is required, processing transitions to processing block 1108 where the processing logic and the wireless station scans for access points. Processing logic then tests whether any access points are found (processing block 1109). If not, processing transitions to processing block 1108 where scanning for access points is repeated. If an access point is found, processing logic transitions to processing block 1110 where processing logic in the wireless station determines whether the access point that has been found is in the same paging area as the previous access point. If not, processing logic and the wireless station selects an access point and then performs a handoff to the selected access point (processing block 1111). If the access point is in the same paging area, processing logic and the wireless station selects the access point of the same paging area and selects the access point as the current access point, (processing block 1112). At this point, the wireless station listens to the current AP.

Figure 12:
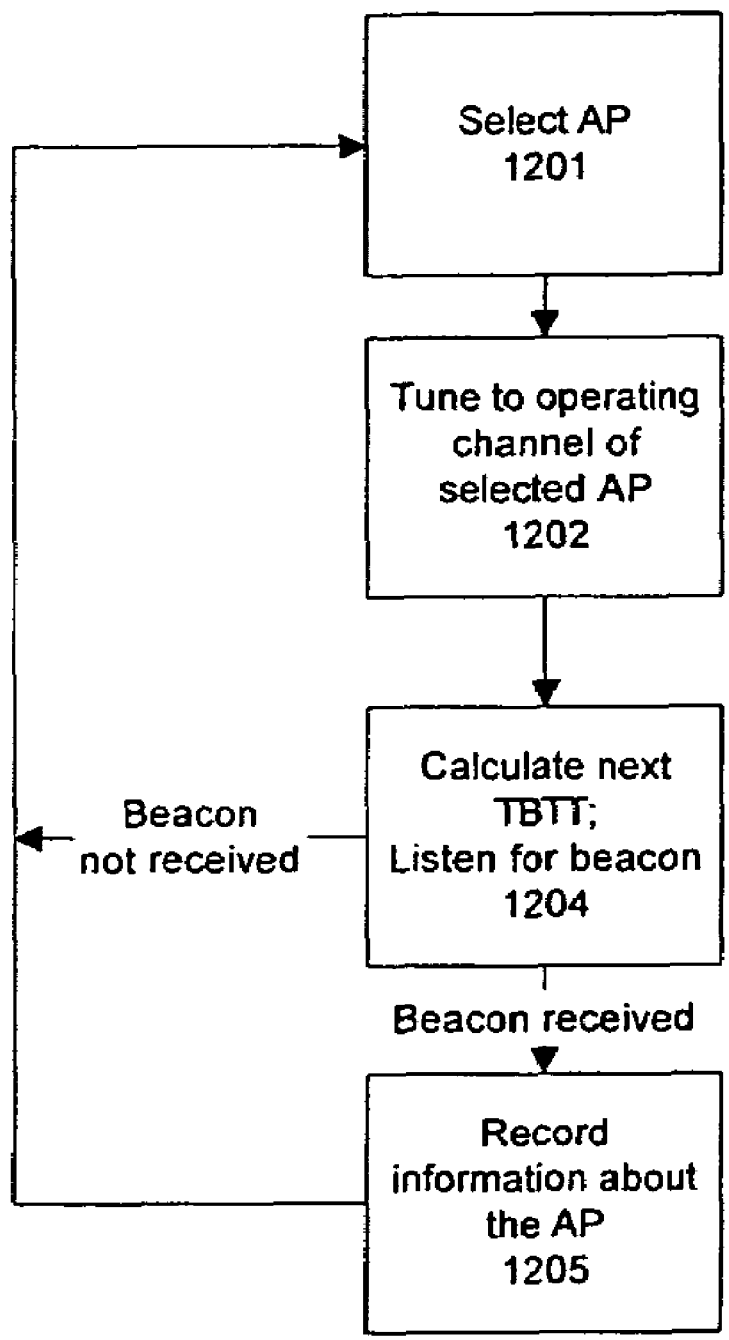
FIG. 12 is a flow diagram of an alternative embodiment for passive scanning performed by a wireless station.

FIG. 12 is a flow diagram of an alternative embodiment for a portion of the passive scanning process performed by a wireless station. The process of FIG. 12 may be used to replace processing blocks 1108 in FIG. 11. The process is performed by processing logic which may comprise hardware (e.g., circuitry, dedicated logic, etc.), software (such as is run on a general purpose computer system or a dedicated machine), or a combination of both.

Referring to FIG. 12, the process begins by processing logic selecting an access point (processing block 1201). This allows the wireless station to select one of a number of access points. After selecting an access point, processing logic in the wireless station tunes to the operating channel of the selected access point (processing block 1202). Note that this may be necessary because the channel could be different than the channel used by the previous serving access point. If a wireless station is paged while listening to the beacon, processing logic transitions to processing block 1104 of FIG. 11 where the process of receiving any paged messages occurs.

Processing transitions to processing block 1204 where processing logic and the wireless station calculates the next target beacon transmission time (TBTT) and determines whether a beacon is received at the TBTT. If a beacon is received the located access point is recorded (processing block 1205) so that it may be used in processing block 1109-1112, and processing transitions to processing block 1201 where the process is repeated. If there is no access point to select, processing logic in the wireless station transitions to processing block 1109.

The wireless station may also perform directed active scanning. In one embodiment, the wireless station performs directed active scanning such as described in PCT Patent Application Number WO 2004/098214, entitled Fast Active Scanning Wireless Network Apparatus and Method, filed on Apr. 2, 2004.

Figure 13:
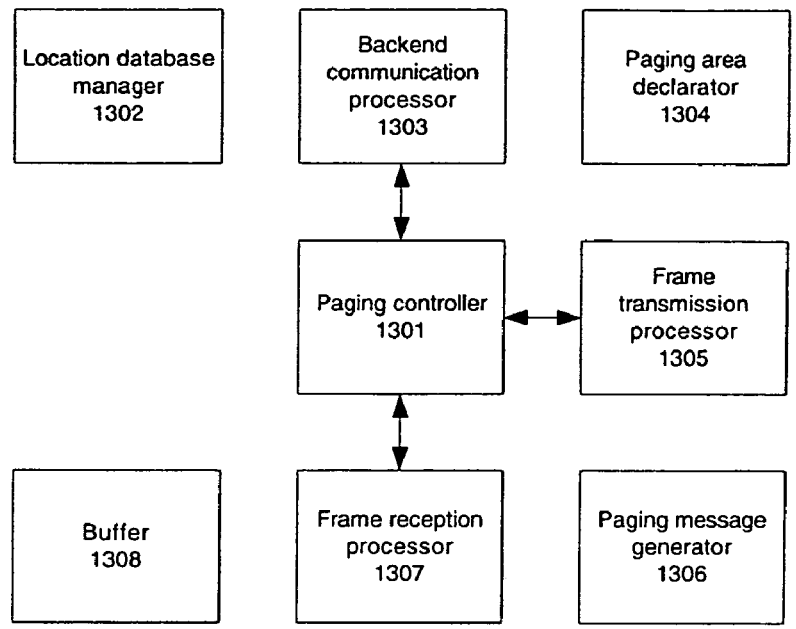
FIG. 13 is a block diagram of one embodiment of an access point.

FIG. 13 is a block diagram of one embodiment of an access point. Each of the blocks may be implemented with hardware, software, or a combination of both. Referring to FIG. 13, access point 1300 includes a paging controller 1301, a location database manager 1302, a backend communication processor 1303, paging area declarator 1304, a frame transmission processor 1305, a paging message generator 1306, a frame reception processor 1307, and a buffer 1308. Backend communication processor 1303 communicates with the network and exchanges packets between the network and the access point. If backend communication processor 1303 receives a packet from the network for a wireless station, it signals, via paging controller 1301, paging message generator 1306 to generate the paging message and buffer 1308 buffers the packets. With respect to paging message generator 1306, for each wireless station, the timing of the paging message is different. Therefore, paging message generator 1306 determines in which beacon the paging message for that wireless station is transmitted. Note that the wireless station may not wake up for every beacon period. In some embodiments, each wireless station wakes up after a certain number of beacon periods. In one embodiment, all wireless stations wake up after the same number of beacon periods or they may wake up after a different number of beacon periods. Paging controller 1301 controls all of these activities and performs functions described above for which the access point is responsible to support dormant mode with paging. Paging area declarator 1304 specifies the paging area ID to be put into the beacon by paging message generator 1306. Paging message generator 1306 provides the paging message to frame transmission processor 1305, which communicates with the transmitter of the access point to transmit the page. Frame reception processor 1307 receives frames from wireless stations. Buffer 1308 buffers frames of packets for transmission to wireless stations in power save mode. Location database manager 1302 manages the location of wireless station.

In one embodiment, backend communication processor 1303, frame transmission processor 1305, frame reception processor 1307 and paging message generator 1306 are all apart of a paging controller of an access point.

Figure 14:
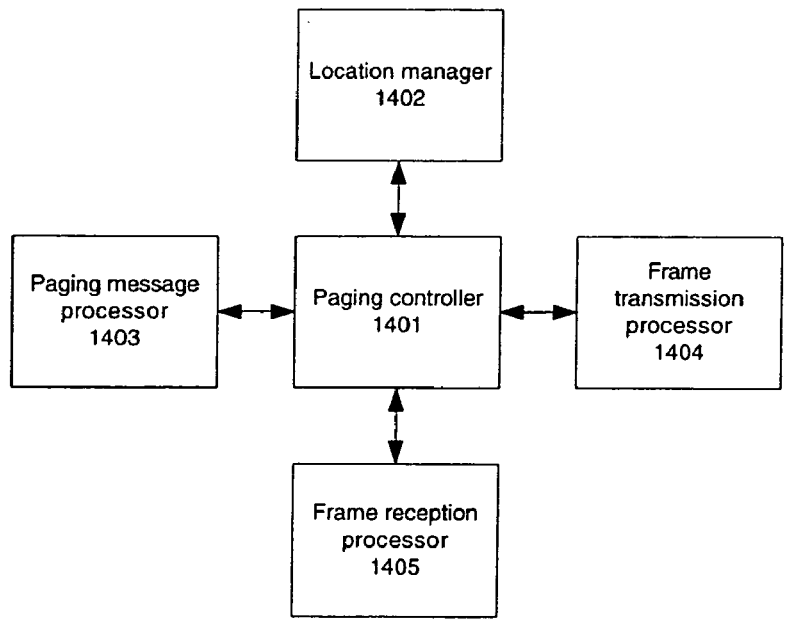
FIG. 14 is a block diagram of one embodiment of a wireless station.

FIG. 14 is a block diagram of one embodiment of a wireless station. Each of the blocks may comprise hardware, software, or a combination of both. Referring to FIG. 14, location manager 1402 stores the information of the last access point that has been associated with a wireless station and information about another access point that it is not receiving the beacon. Frame reception processor 1405 receives messages including the beacon. Frame reception processor 1405 sends the received paging area ID to paging message processor 1403, which determines whether the paging area has changed or not and whether there is a message for the wireless station has been sent. Frame transmission processor 1404 transmits frames to access points. Location manager 1402, paging message processor 1403, frame transmission processor 1404 and frame reception processor 1405 are controlled by paging controller 1401. Paging controller 1401 also performs the wireless station's functions described above with respect to supporting the dormant mode with paging, apart from those performed by location manager 1402, paging message processor 1403, frame transmission processor 1404 and frame reception processor 1405.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless station, having established a paging channel with a first access point and having associated with the first access point prior to the wireless station entering the power savings mode, comprising:
   a location manager to store information of one or more access points that are in a group of access points with the first access point, the group of access points define a paging area, and the information of each of the one or more access points includes a Basic Service Set Identifier (BSSID) and one or more of the following: target beacon transmission time (TBTT), TBTT offset, beacon interval, and beacon interval ratio;
   a paging message processor to receive a beacon having a paging area identifier, wherein the paging message processor is configured to determine that paging area has not changed when the received beacon is from the first access point, wherein the wireless station performs scanning based on the stored information to receive a beacon or a probe response of a second access point when the beacon from the first access point is not received, wherein the paging message processor is configured to determine that the paging area has not changed when the beacon or the probe response from the one or more access points that are in the group of access points with the first access point is received based on the scanning, and to determine the paging area has changed when the beacon or the probe response from the first access point and the one or more access points in the group of access points is not received based on the scanning, where the wireless station uses the one or more of the TBTT, TBTT offset, beacon interval, and beacon interval ratio when determining the new time for the beacon, and where the wireless station uses BSSID when sending a directed probe reciuest to solicit a probe response; and
   a paging controller coupled to the paging message processor,
      wherein the paging controller is configured to establish a paging channel with the second access point through a handoff procedure when the paging area has changed, wherein the paging controller is configured to establish the paging channel with the handoff procedure by:
         synchronizing to the second access point;
         authenticating the wireless station with the second access point; and
         associating the wireless station and the second access point; and
      wherein the paging controller is configured to establish the paging channel with the second access point without performing the handoff procedure when the paging area has not changed, wherein the paging controller is configured to establish the paging channel with the second access point by
         synchronizing to the second access point without authenticating the wireless station with the second access point, and without associating the wireless station and the second access point.

2. The wireless station defined in claim 1, wherein the wireless station performs scanning by selecting one of the access points stored in the location manager, and transmitting a directed probe request frame to the selected access point, wherein the BSSID of the selected access point is included in the destination address field or in the BSSID field of the directed probe request frame.

3. The wireless station defined in claim 1, wherein the wireless station performs scanning by selecting one of the access points stored in the location manager, determining the TBTT of the selected access point based on the stored information, and listening for the beacon of the selected access point at the TBTT of the selected access point.

4. The wireless station defined in claim 1 wherein the paging area identifier of the received beacon is received from a virtual channel.

5. The wireless station defined in claim 4, wherein the paging area identifier of the group of access points distinctly identifies the group of access points to which the first access point belongs.

6. The wireless station defined in claim 1, wherein when the second access point is not in the same group of access points, the paging controller is configured to synchronize to the second access point by adopting the timing information of the second access point, wherein the paging controller is configured to authenticate the wireless station with the second access point by establishing the wireless station's identity as a member of a set of stations authorized to associate with the second access point, and wherein the paging controller is configured to associate the wireless station and the second access point by establishing a mapping between the second access point and the wireless station, and wherein when the second access point is in the same group of access points, the paging controller is configured to synchronize to the second access point by adopting the timing information of the second access point.

7. An access point comprising:
   a paging message generator to generate a paging message for a wireless station, the wireless station having a location manager to store a Basic Service Set Identifier (BSSID) and one or more of the following: target beacon transmission time (TBTT), TBTT offset, beacon interval, beacon interval ratio, and access point identifiers for all access points in a group of access points that includes the access point, the group of access points define a paging area, wherein the location manager allows the wireless station to perform scanning based on the stored information to receive a beacon or a probe response of a second access point; and
   a paging controller to send a signal to the wireless station having the BSSID and the one or more of the following: TBTT, TBTT offset, beacon interval, beacon interval ratio, and access point identifiers for the group of access points to be stored in the location manager of the wireless station, wherein the wireless station is configured to determine that the paging area has changed when the beacon or the probe response is not received from the one or more access points that are in the group of access points with the access point using the stored information, to perform a handoff procedure to establish a paging channel with a second access point when the second access point is not in the same group of access points, and to not perform the handoff procedure to establish the paging channel with the second access point when the second access point is in the same group of access points,
   wherein the paging controller is configured to establish the paging channel with the second access point with the handoff procedure by:
      synchronizing to the second access point, authenticating the wireless station with the second access point, and associating the wireless station and the second access point, and wherein the paging controller is configured to establish the paging channel with the second access point without the handoff procedure by synchronizing to the second access point without authenticating the wireless station with the second access point, and without associating the wireless station and the second access point.

8. The access point defined in claim 7 wherein the paging message generator determines in which beacon the paging message for the wireless station is transmitted.

9. The access point defined in claim 7 wherein the wireless station performs scanning by selecting one of the access points in the location manager and executing either active scanning or passive scanning, wherein a directed probe request with the BSSID of the selected access point being included in the destination address field or in the BSSID field is sent to the selected access point when executing active scanning, and the TBTT of the selected access point is determined based on the stored information when executing passive scanning.

10. The access point defined in claim 7 wherein the paging channel is a virtual channel.

11. The access point defined in claim 7 wherein the paging controller uses the paging channel to notify the wireless station that a message has been received for the wireless station when the wireless station was in the power savings mode.

12. The access point defined in claim 11 further comprising a buffer to buffer the message until the wireless station exits the power savings mode and receives the message.

13. The access point defined in claim 7 wherein the paging controller sends a beacon on the paging channel, the beacon containing a paging identifier distinctly identifying the group of access points to which the one access point belongs.

14. The access point defined in claim 7 wherein when the second access point is not in the same group of access points, the paging controller is configured to synchronize to the second access point by adopting the timing information of the second access point, wherein the paging controller is configured to authenticate the wireless station with the second access point by establishing the wireless station's identity as a member of a set of stations authorized to associate with the second access point, and wherein the paging controller is configured to associate the wireless station and the second access point by establishing a mapping between the second access point and the wireless station, and wherein when the second access point is in the same group of access points, the paging controller is configured to synchronize to the second access point by adopting the timing information of the second access point.

15. A method comprising:

establishing a paging channel with a first access point;

associating with the first access point prior to the wireless station entering the power savings mode;

storing at the wireless station information of one or more access points that are in the same group of access points with the first access point, the group of access points define a paging area, and the information of each of the one or more access points includes a Basic Service Set Identifier (BSSID) and one or more of the following: target beacon transmission time (TBTT), TBTT offset, beacon interval, and beacon interval ratio receiving a beacon having a paging area identifier;

determining whether the paging area identifier has changed, comprising:

determining that the paging area has not changed when the received beacon is from the first access point;

performing scanning based on the stored information to receive a beacon or a probe response of a second access point based on the stored information when the beacon from the first access point is not received;

determining that the paging area has not changed when the beacon or the probe response from the one or more access points that are in the group of access points with the first access point is received based on the scanning;

determining that the paging area has changed when the beacon is or the probe response from the first access point and the one or more access points in the group of access points is not received based on the scanning, wherein the wireless station uses the one or more of the TBTT, TBTT offset, beacon interval, and beacon interval ratio when determining the new time for the beacon, and where the wireless station uses BSSID when sending a directed probe request to solicit a probe response;

establishing a paging channel with the second access point through a handoff procedure when the paging area has changed; and establishing the paging channel with the second access point without performing the handoff procedure when the paging area has not changed, wherein establishing the paging channel with the handoff procedure comprises:

synchronizing the wireless station to the second access point;

authenticating the wireless station with the second access point; and associating the wireless station and the second access point, and wherein establishing the paging channel without performing the handoff procedure comprises synchronizing the wireless station to the second access point without authenticating the wireless station with the second access point, and without associating the wireless station and the second access point.

16. The method defined in claim 15 further comprising the plurality of access points in the access point group exchanging identifiers and traffic indication maps (TIMs) for the plurality of access points with each of the other access points of the access point group.

17. The method defined in claim 15 further comprising at least one access points sending a signal to the wireless station having the TIMs and access point identifiers for all access points in the access point group.

18. The method defined in claim 15 further comprising receiving the beacon on a virtual channel.

19. The method defined in claim 15 notifying the wireless station that a message has been received for the wireless station when the wireless station was in the power savings mode.

20. The method defined in claim 15 wherein the beacon contains a paging identifier distinctly identifying the access point group to which the first access point belongs.

21. The method defined in claim 15 wherein synchronizing comprises adopting the timing information of the second access point, wherein authenticating comprises the wireless station's identity as a member of a set of stations authorized to associate with the second access point, and wherein associating comprises establishing a mapping between the second access point and the wireless station.

22. A communication system comprising:
a wireless station operable in a power savings mode, having a location manager to store information including identifiers, traffic identification maps, and one or more of the following: target beacon transmission time (TBTT), TBTT offset, beacon interval, and beacon interval ratio; and
a plurality of groups of access points, wherein each group of access points comprises one or more access points with at least one group of access points having at least two access points, wherein ranges for the one or more access points in each of the plurality of groups define a paging area for said each group, and wherein access points in each group of access points exchange identifiers, traffic identification maps, and the one or more of the following: TBTT, TBTT offset, beacon interval, and beacon interval ratio for the access points with the access points in their group,
wherein at least one access point of the at least one group of access points sends a signal to the wireless station having the TIMs, the access point identifiers, and the one or more of the following: TBTT, TBTT offset, beacon interval, and beacon interval ratio for all access points in the at least one group of access points to be stored in the location manager of the wireless station to allow the wireless station to perform scanning based on the stored information to receive a beacon or a probe response from a new access point,
wherein a first access point uses a paging channel for paging the wireless station when the wireless station is in the power savings mode and is in the paging area associated with the first access point, the wireless station performing a handoff procedure when the first access point is not in the same group of access points as a second access point having an established paging channel with the wireless station prior to the wireless station entering the power savings mode and not performing a handoff procedure when the first access point is in the same group of access points as the second access point having the established paging channel with the wireless station prior to the wireless station entering the power savings mode, wherein when the first access point is not in the same group of access points as the second access point, the paging controller is configured to establish the paging channel with the first access point by synchronizing to the first access point, authenticating the wireless station with the first access point, and associating the wireless station and the first access point, and wherein when the first access point is in the same group of access point as the second access point, the paging controller configured to establish the paging channel with the first access point by synchronizing to the first access point without authenticating the wireless station with the first access point, and without associating the wireless station and the first access point.

23. The communication system defined in claim 22 wherein the paging channel is a virtual channel.

24. The communication system defined in claim 22 wherein the first access point uses the paging channel to notify the wireless station that a message has been received for the wireless station when the wireless station was in the power savings mode.

25. The communication system defined in claim 24 wherein the first access point buffers the message until the wireless station exits the power savings mode and receives the message.

26. The communication system defined in claim 22 wherein the first access point sends a beacon on the paging channel, the beacon containing a paging identifier distinctly identifying the group of access points to which the first access point belongs.

27. A communication system comprising
a plurality of groups of access points, wherein each group of access points comprises one or more access points with at least one group of access points having at least two access points, each access point in each group uses a paging area identifier to define a paging area of the group, the paging area identifier being unique to the group when broadcasting in the paging area for each group as part of paging by access points in each group, wherein access points in each group of access points exchange identifiers, traffic indication maps (TIMs), and one or more of the following: target beacon transmission time (TBTT), TBTT offset, beacon interval, and beacon interval ratio for the access points with the access points in their group, wherein at least one access point of the at least one group of access points sends a signal to a wireless station having the TIMs, access point identifiers and the one or more of the following: TBTT, TBTT offset, beacon interval, and beacon interval ratio for all access points in the at least one group of access points to be stored in a location manager of the wireless station, wherein the wireless station is configured to perform scanning to receive a beacon or a probe response of a new access point for establishing a paging channel with the new access point without performing a complete handoff procedure when the new access point is one of the access points in the same group.

28. The communication system defined in claim 27 wherein access points in a each group use a paging channel to notify that a message has been received for a wireless station when the wireless station was in the power savings mode, wherein the paging channel is a virtual channel.

29. The communication system as claimed in claim 27 wherein the unique paging identifier comprises a unique paging area identification number.

30. The communication system as claimed in claim 27 wherein the unique paging area identification number is included in a beacon packet broadcast by the one or more access points in its corresponding group of access points.

31. The communication system as claimed in claim 27 further comprising a wireless station.

32. The communication system defined in claim 27 further comprising a wireless station operable in a power savings mode, wherein at least one access point uses paging when the wireless station is in the power savings mode and is in the paging area associated with the at least one access point to notify the wireless unit that a message has been received for the wireless station.

* * * * *